(12) United States Patent
Roychoudhury et al.

(10) Patent No.: US 10,351,094 B2
(45) Date of Patent: Jul. 16, 2019

(54) VEHICLE AIRBAG WITH ACTIVE VENT

(71) Applicant: Ford Global Technologies, LLC, Dearborn, MI (US)

(72) Inventors: Raj S. Roychoudhury, Bloomfield Hills, MI (US); John A. Young, Grosse Ile, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 6 days.

(21) Appl. No.: 15/642,656

(22) Filed: Jul. 6, 2017

(65) Prior Publication Data
US 2017/0297526 A1    Oct. 19, 2017

Related U.S. Application Data

(63) Continuation of application No. 14/695,329, filed on Apr. 24, 2015, now Pat. No. 9,725,065.

(51) Int. Cl.
*B60R 21/239* (2006.01)

(52) U.S. Cl.
CPC .... *B60R 21/239* (2013.01); *B60R 2021/2395* (2013.01)

(58) Field of Classification Search
CPC .......................... B60R 21/239; B60R 21/2395
See application file for complete search history.

(56) References Cited

U.S. PATENT DOCUMENTS

| | | | |
|---|---|---|---|
| 5,931,497 A * | 8/1999 | Fischer | B60R 21/2338 280/735 |
| 6,139,048 A * | 10/2000 | Braunschadel | B60R 21/2338 280/728.1 |
| 6,145,878 A * | 11/2000 | Weikl | B60R 21/239 280/739 |
| 8,328,233 B2 | 12/2012 | Kalisz | |
| 8,343,486 B2 | 1/2013 | Carter et al. | |
| 8,720,943 B1 | 5/2014 | Mazzocchi et al. | |
| 8,746,736 B2 | 6/2014 | Mendez et al. | |
| 9,376,085 B1 | 6/2016 | Cischke et al. | |

(Continued)

FOREIGN PATENT DOCUMENTS

| | | |
|---|---|---|
| CN | 103661229 | 3/2014 |
| EP | 2110287 | 3/2013 |

OTHER PUBLICATIONS

Occupant Safety Sytems; Driver Side Airbag with Self Adaptive Venting (SAVe), © TRW Automotive 2013, 1 page.

(Continued)

*Primary Examiner* — Barry Gooden, Jr.
(74) *Attorney, Agent, or Firm* — Frank A. MacKenzie; Bejin Bieneman PLC

(57) ABSTRACT

An apparatus includes a main body substantially enclosing an interior volume. The main body is elastically expandable to an inflated configuration. The apparatus further includes a vent aperture in the main body and a vent cover at least partially overlapping the vent aperture. The vent aperture and the vent cover define a passage from the interior volume to outside of the main body. In the inflated configuration of the main body and within a pressure threshold of the interior volume, the vent cover constricts the passage proportionately to a pressure increase in the interior volume of the main body.

16 Claims, 5 Drawing Sheets

(56) References Cited

U.S. PATENT DOCUMENTS

| | | | |
|---|---|---|---|
| 2003/0222446 A1* | 12/2003 | Soderquist | B60R 21/231 280/743.1 |
| 2006/0290118 A1 | 12/2006 | Thomas | |
| 2007/0187936 A1* | 8/2007 | Britz | B60R 21/239 280/739 |
| 2007/0200320 A1* | 8/2007 | Keshavaraj | B60R 21/206 280/730.1 |
| 2007/0216146 A1 | 9/2007 | Williams et al. | |
| 2007/0284861 A1* | 12/2007 | Helmstetter | B60R 21/239 280/739 |
| 2008/0073893 A1 | 3/2008 | Schneider | |
| 2008/0303256 A1 | 12/2008 | Williams | |
| 2009/0121461 A1* | 5/2009 | Abe | B60R 21/2338 280/728.3 |
| 2012/0235393 A1 | 9/2012 | Fisher et al. | |
| 2012/0306187 A1 | 12/2012 | Mendez et al. | |
| 2013/0119645 A1 | 6/2013 | Eckert et al. | |
| 2014/0008901 A1 | 1/2014 | Kranzle et al. | |
| 2014/0217712 A1 | 8/2014 | Nakamura et al. | |
| 2014/0300094 A1 | 10/2014 | Williams | |
| 2014/0306433 A1* | 10/2014 | Anderson | B60R 21/233 280/729 |
| 2015/0054268 A1* | 2/2015 | Raines | B60R 21/239 280/736 |
| 2015/0239424 A1 | 8/2015 | Nebel et al. | |
| 2015/0283971 A1 | 10/2015 | Fischer et al. | |
| 2015/0283973 A1 | 10/2015 | Jang | |
| 2015/0298643 A1 | 10/2015 | Schneider et al. | |
| 2015/0314747 A1 | 11/2015 | Weber et al. | |
| 2015/0336534 A1 | 11/2015 | Kim | |
| 2015/0375709 A1* | 12/2015 | Anderson | B60R 21/233 280/729 |
| 2016/0001733 A1 | 1/2016 | Kim et al. | |
| 2016/0009244 A1* | 1/2016 | Anderson | B60R 21/233 280/729 |
| 2016/0031408 A1 | 2/2016 | Ko | |
| 2016/0311394 A1* | 10/2016 | Roychoudhury | B60R 21/239 |

OTHER PUBLICATIONS

Yao et al, Concept Design of an A-Pillar Mounted Airbag for Pedestrian Head Protection, 6$^{th}$ European LS-DYNA Users' Conference, 14 pages.

* cited by examiner

US 10,351,094 B2

VEHICLE AIRBAG WITH ACTIVE VENT

BACKGROUND

Vehicles, such as automobiles, may include equipment for protecting passengers from the impact of collisions, for example, safety belts, airbags and energy absorption mechanisms. However, it is currently difficult to provide adjustments in all of this equipment for differences in certain collision conditions, such as the magnitude and direction of a force applied to an airbag that varies due to the size of occupants and/or the speed of a vehicle may be travelling, in mass-market passenger vehicle design. By way of example, typical current airbags are designed to inflate to a set pressure determined with respect to preferred absorption performance at a relatively high test speed, and thereby only provide a single stiffness for all collisions. As such, that stiffness may not be optimized for impact events involving relatively smaller forces, e.g. relatively low speed impact events. Moreover, current mechanisms for actively adjusting deployment of equipment such as airbags, e.g. to provide variable stiffness performance under varying conditions, suffer from drawbacks including their complexity and cost.

DRAWINGS

DETAILED DESCRIPTION

An active airbag vent according to the principles of the present disclosure operates inversely proportionally to pressure acting on the airbag. That is, in contrast to typical elastically deformable airbags with vents that expand with an increase in pressure on the airbag, an active airbag vent according to the principles of the present disclosure constricts or closes with an increase in pressure on the airbag. As such, an airbag with an active vent according to this disclosure may have a variable stiffness performance according to the magnitude of a force applied to the airbag. For example, typically an airbag with a greater stiffness is preferred to cushion an impact at a relatively high speed and/or involving an object with a relatively large mass. With the inverse proportional adjustment of the active vent of the present disclosure, when a force is applied to an inflated airbag, the vent constricts from an initial inflated position, and the airbag performs with a relatively increased stiffness, according to the relatively high impact force. In another example, for a relatively smaller object, or an object at an unexpected direction of travel, a lesser stiffness may be desired. With the active vent of the present disclosure, such a relatively lesser, acceptable stiffness may be provided by the initial position of the vent and may be maintained, or substantially maintained, in response to such a force. After removal of a force from the airbag, the vent opens and releases the constriction caused by the applied force. Additionally, during the inflation of an airbag with an active vent according to this disclosure—i.e. prior to an expected impact with the airbag, the active vent may relatively lessen the inflation pressure. As such, an airbag with an active vent according to the principles of this disclosure exerts relatively low forces both on the support structures of the vehicle and in the inflation path of the airbag during inflation. Lower forces on the vehicle support structures may increase durability or increase the durability and robustness of those structures. Lower forces in the inflation path may provide more desirable characteristics in the event of an out of position occupant, i.e. an occupant unexpectedly in the inflation path during inflation of the airbag.

Figure 1:
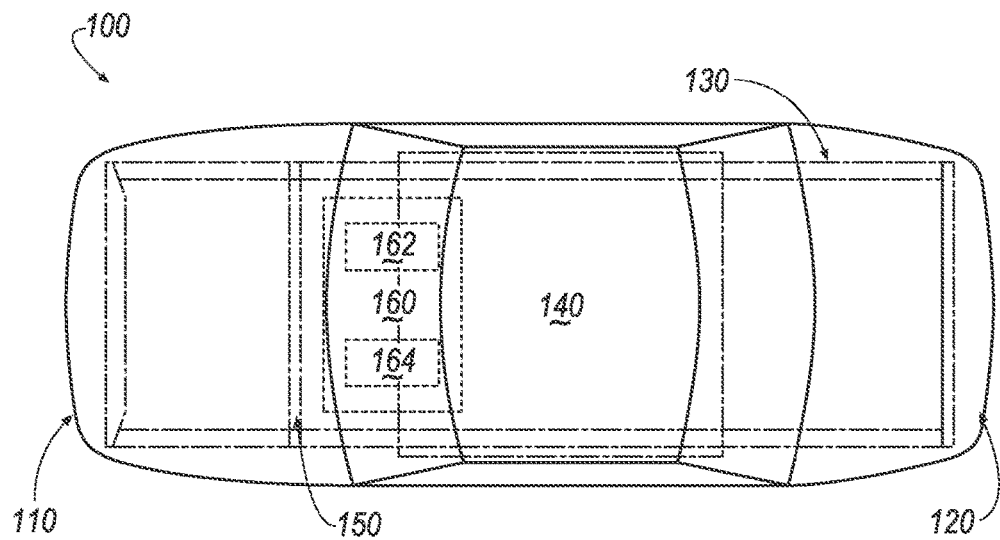
FIG. 1 is a schematic top view of an exemplary vehicle.

FIG. 1 is an exemplary schematic illustration of a vehicle 100 with a front end 110 and a back end 120. The vehicle 100 includes a frame assembly 130, and a passenger cabin 140. The frame assembly 130 includes an instrument panel beam 150 extending in a lateral direction across vehicle 100. The instrument panel beam 150 is longitudinally forward of and adjacent to the passenger cabin 140. The instrument panel beam 150 supports at least one airbag module 160. The airbag module 160 includes an airbag bladder 162 and an inflator 164.

The vehicle 100 operates the one or more airbag modules 160 under certain conditions, e.g. a collision with the front end 110 of the vehicle 100 of a certain magnitude. For example, the vehicle 100 may include a vehicle computer (not shown) in communication with the airbag module 160 that generally includes a processor and a memory, the memory including one or more forms of computer-readable media, and storing instructions executable by the processor for performing various operations. Further, the computer may include more than one computing device, e.g., controllers for various vehicle components, e.g., an engine control unit (ECU), transmission control unit (TCU), etc. The computer may transmit messages to various devices in a vehicle and/or receive messages from the various devices, e.g., controllers, actuators, sensors, etc., including the airbag module 160.

Figure 2:
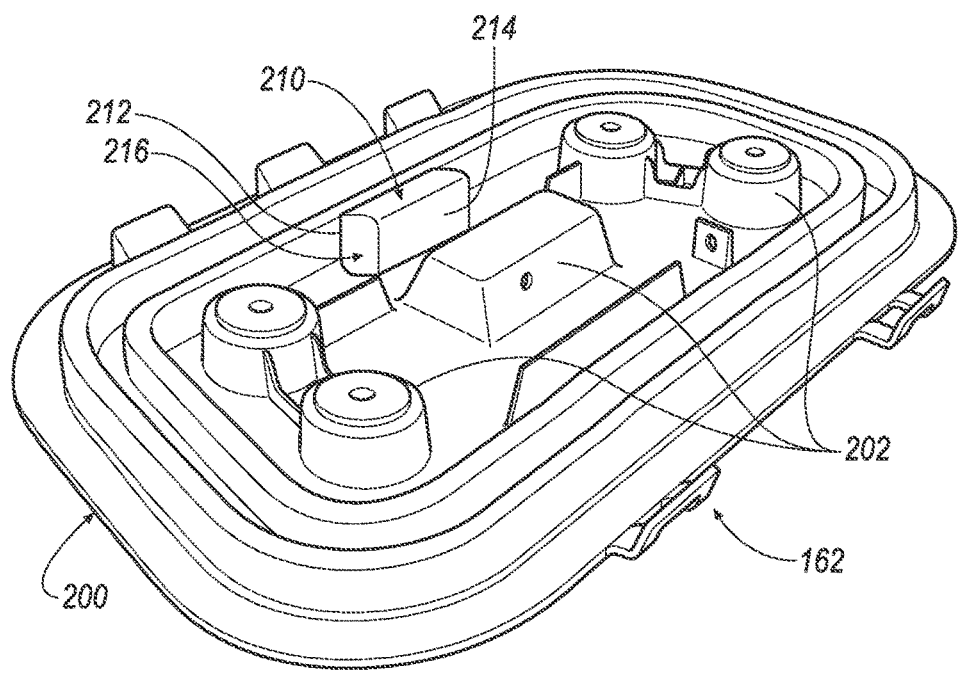
FIG. 2 is a perspective view of an exemplary airbag bladder according to the principles of the present disclosure.
Figure 3A:
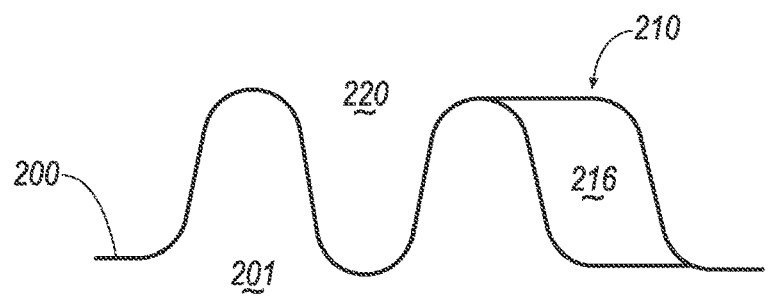
FIG. 3A is an exemplary top cutaway view of an active airbag vent according to the principles of the present disclosure in a first position.
Figure 3B:
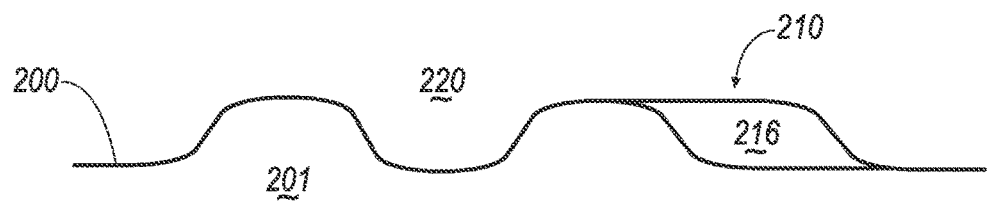
FIG. 3B is an exemplary top cutaway view of the vent of FIG. 3A in a second position.
Figure 3C:
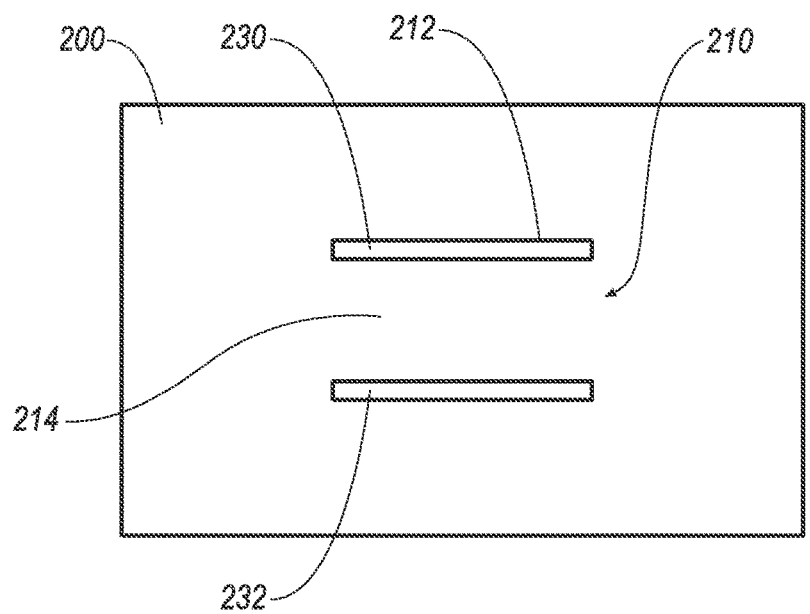
FIG. 3C is an exemplary plan view of the vent of FIGS. 3A-B.

FIG. 2 is a perspective view of the airbag bladder 162. The bladder 162 includes a main body 200 formed with an elastically deformable material. In some implementations, the main body 200 includes plastic material. The main body 200 substantially encloses an interior volume 201 (FIGS. 3A-3C). The inflator 164 is in fluid communication with the interior volume 201, and the main body 200 is elastically expandable to an inflated configuration.

The bladder 162 may have a variety of configurations depending on the specific application and location of the airbag module 160. The bladder 162 may include protrusions 202 for interfacing with particular structures of vehicle 100. In one exemplary implementation, the bladder 162 may be utilized in an active glove box application, and the protrusions 202 may correspond with and/or attach to respective structural features of the glove box. It should be understood that an airbag bladder according to the principles of the present disclosure may be employed in a variety of vehicle applications and locations, such as, by way of non-limiting example, at the steering column, in the seats or seat backs, at relatively rigid portions of the vehicle trim, etc.

The bladder 162 includes an active vent 210. The vent 210 is defined by an aperture portion 212 and a cover portion 214. As described herein, the cover portion 214 at least partially overlaps the aperture portion 212 and is configured, with the aperture portion 212, to constrict a passage 216 from the interior volume 201 to a region 220 outside the bladder 162 proportionally to a change in pressure in the bladder 162 while inflated, as long as the pressure is below a maximum pressure threshold. Through this variable venting, the inflated bladder 162 provides adjustable stiffness performance based on the magnitude of a force applied to the bladder 162 while inflated. Upon removal of the force, the active vent 210 may reopen to the initial position, at least as long as the bladder 162 remains inflated. As such, the bladder 162 adjusts to a variety of conditions that vary with the magnitude of an impact with an airbag, including the size, speed and direction of the impacting object.

The cover portion 214 may have the same material composition as the main body 200, and may be integrally formed with the main body 200.

The bladder 162 is shown in the exemplary illustration of FIG. 2 with one vent 210. It should be understood that an airbag bladder according to the principles of the present disclosure may include multiple active vents.

Referring to FIGS. 3A-3C, in one implementation, the vent 210 is configured with the aperture portion 212 extending partially outside of the cover portion 214. In particular, first and second open regions 230, 232 are defined in the aperture portion 212 at opposing sides of the cover portion 214. With particular reference to FIGS. 3A and 3B, the cover portion 214 may variably protrude away from the adjacent portions of the main body 200, adjusting the size of the passage 216 in inverse proportion to the pressure of the internal volume 201—that is, in inverse proportion to set inflation pressure and the pressure resultant from any impact with the bladder 162. At or above a maximum pressure threshold, the bladder 162 stretches the cover portion 214 so as to be substantially planar with the adjacent portions of the main body 200, and the passage 216 is constricted up to a minimum size defined by the first and second open regions 230, 232.

Figure 4A:
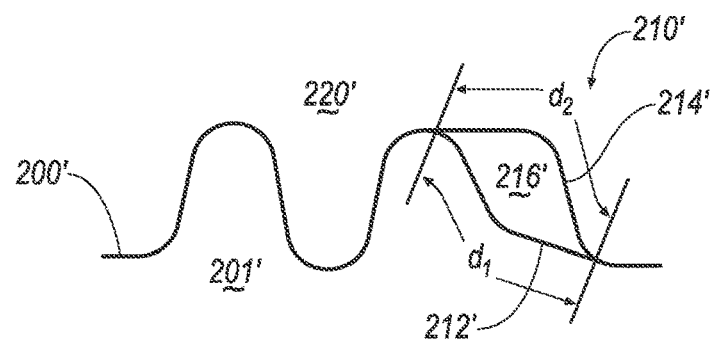
FIG. 4A is an exemplary top cutaway view of another active airbag vent according to the principles of the present disclosure in a first position.
Figure 4B:
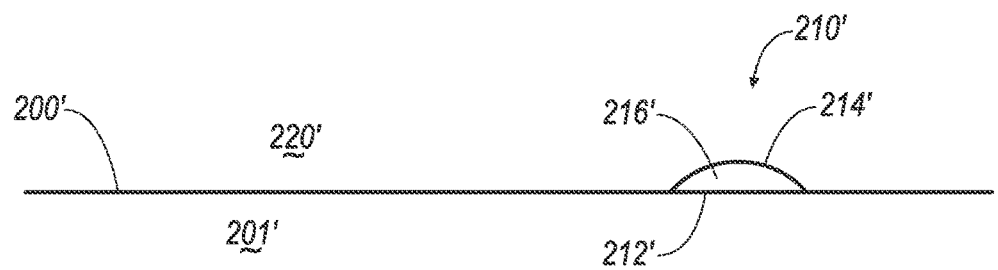
FIG. 4B is an exemplary top cutaway view of the vent of FIG. 4A in a second position.
Figure 4C:
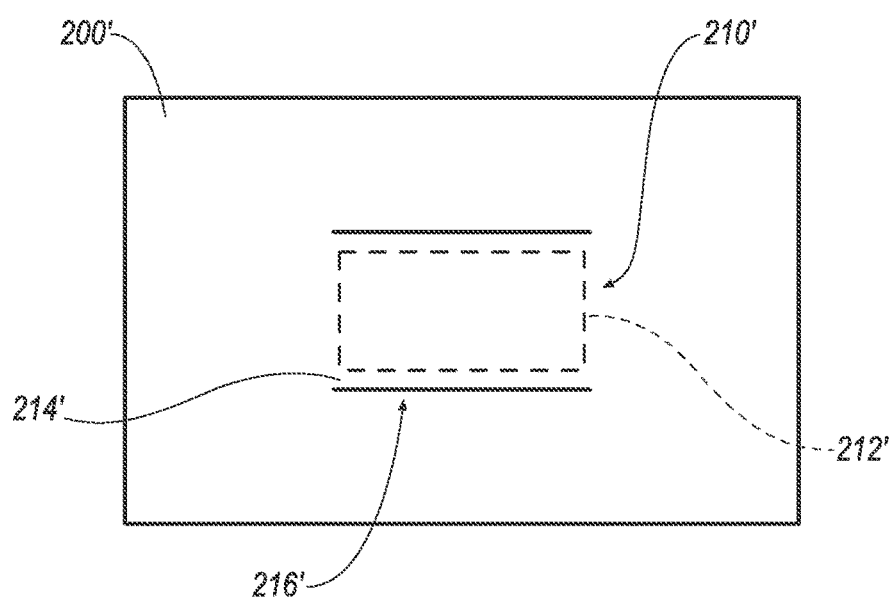
FIG. 4C is an exemplary plan view of the vent of FIGS. 4A-B.

Referring to FIGS. 4A-4C, another active vent 210' according to the principles of the present disclosure is illustrated. It should be understood that the description herein of the vehicle 100, the airbag module 160, and the airbag bladder 162 with respect to the vent 210 similarly applies to the vent 210' and, accordingly, is not repeated herein.

The vent 210' includes an aperture portion 212' and a cover portion 214'. The cover portion 214' is larger than the aperture portion 212', in at least one of the lengths across the aperture portion 212'. That is, at least the size $d_2$ of the cover portion 214' between the edges of the aperture portion 212' is greater than the size $d_1$ of the corresponding region bounded by the edges of the aperture portion 212.' In some implementations, as particularly illustrated in FIG. 4C, the cover portion 214' is larger than the aperture portion 212' in multiple directions and has a surface area that completely overlaps the aperture portion 212'.

The cover portion 214' bows or buckles away from the aperture portion 212' to define the passage 216'. As pressure increases in the interior volume 201', the passage 216' is constricted. As $d_2$ is greater than $d_1$, in at least one direction, a minimum size for the passage 216' is maintained at the maximum pressure threshold, including in implementations where the cover portion 214' completely overlaps the aperture portion 212' (FIG. 4C).

Figure 5A:
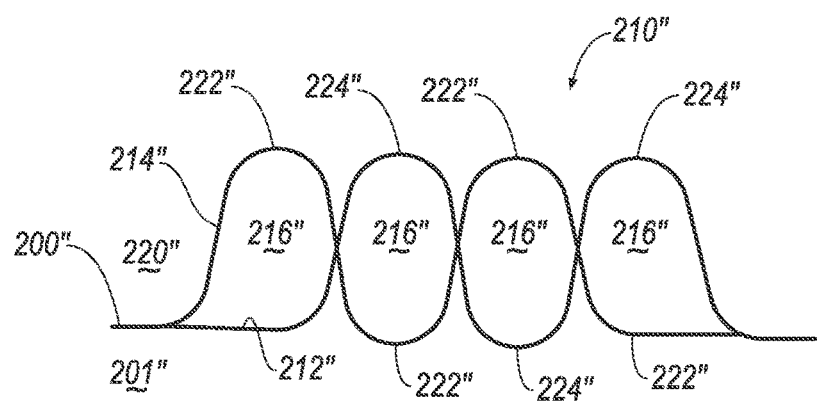
FIG. 5A is an exemplary top cutaway view of another active airbag vent according to the principles of the present disclosure in a first position.
Figure 5B:
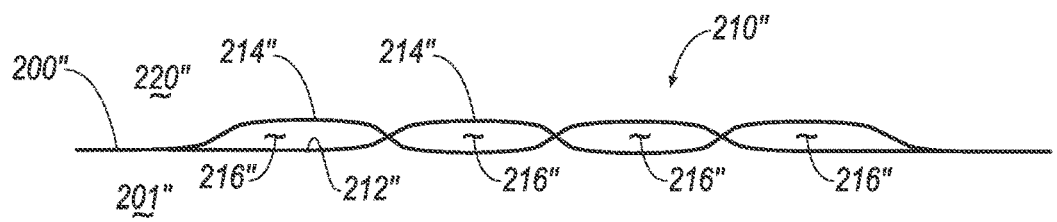
FIG. 5B is an exemplary top cutaway view of the vent of FIG. 5A in a second position.
Figure 5C:
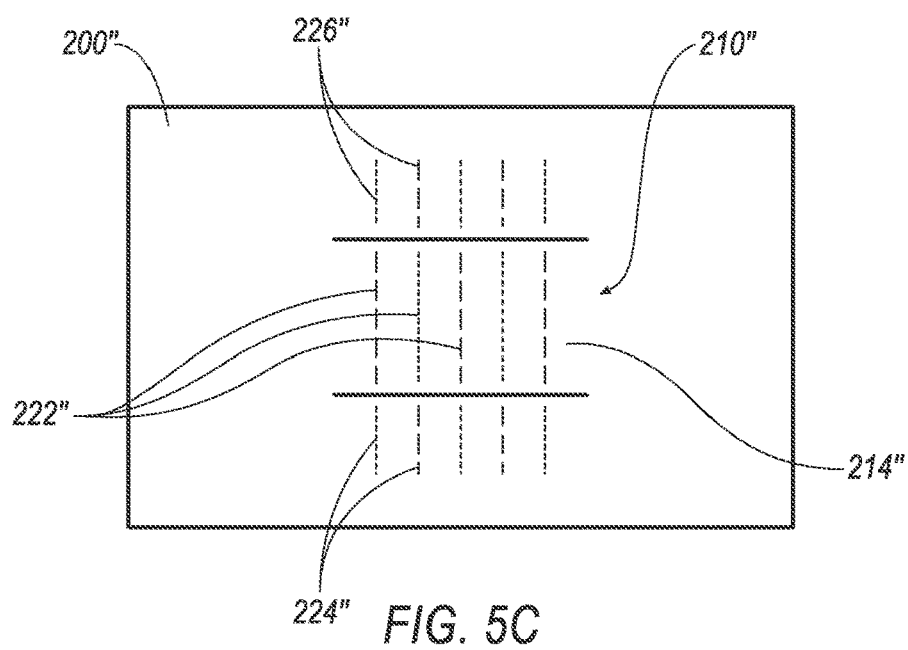
FIG. 5C is an exemplary plan view of the vent in the second position of FIG. 5B.

Referring to FIGS. 5A-5C, another active vent 210" according to the principles of the present disclosure is illustrated. It should be understood that the description herein of the vehicle 100, the airbag module 160, and the airbag bladder 162 with respect to the vent 210 similarly applies to the vent 210" and, accordingly, is not repeated herein.

The cover portion 214" of the vent 210" is at least partially corrugated, i.e. includes undulating corrugations 222". The corrugations 222" are in an offset alignment with at least one set of corrugations 224" on the main body 200" adjacent the aperture portion 212". In some implementations, another set of corrugations 226", also in an offset alignment with respect to the corrugations 222" of the vent cover 214", are on the main body 200" at an opposing portion of the vent aperture 212" relative to the corrugations 224". As such, the offset corrugations of the cover portions 214" and the main body 200" bow or buckle away from the aperture portion 212" to collectively define the passage 216". As pressure increases in the interior volume 201", the vent 210" constricts the spacing of the corrugations, and thus the passage 216", up to a minimum size at the maximum pressure threshold.

Figure 6:
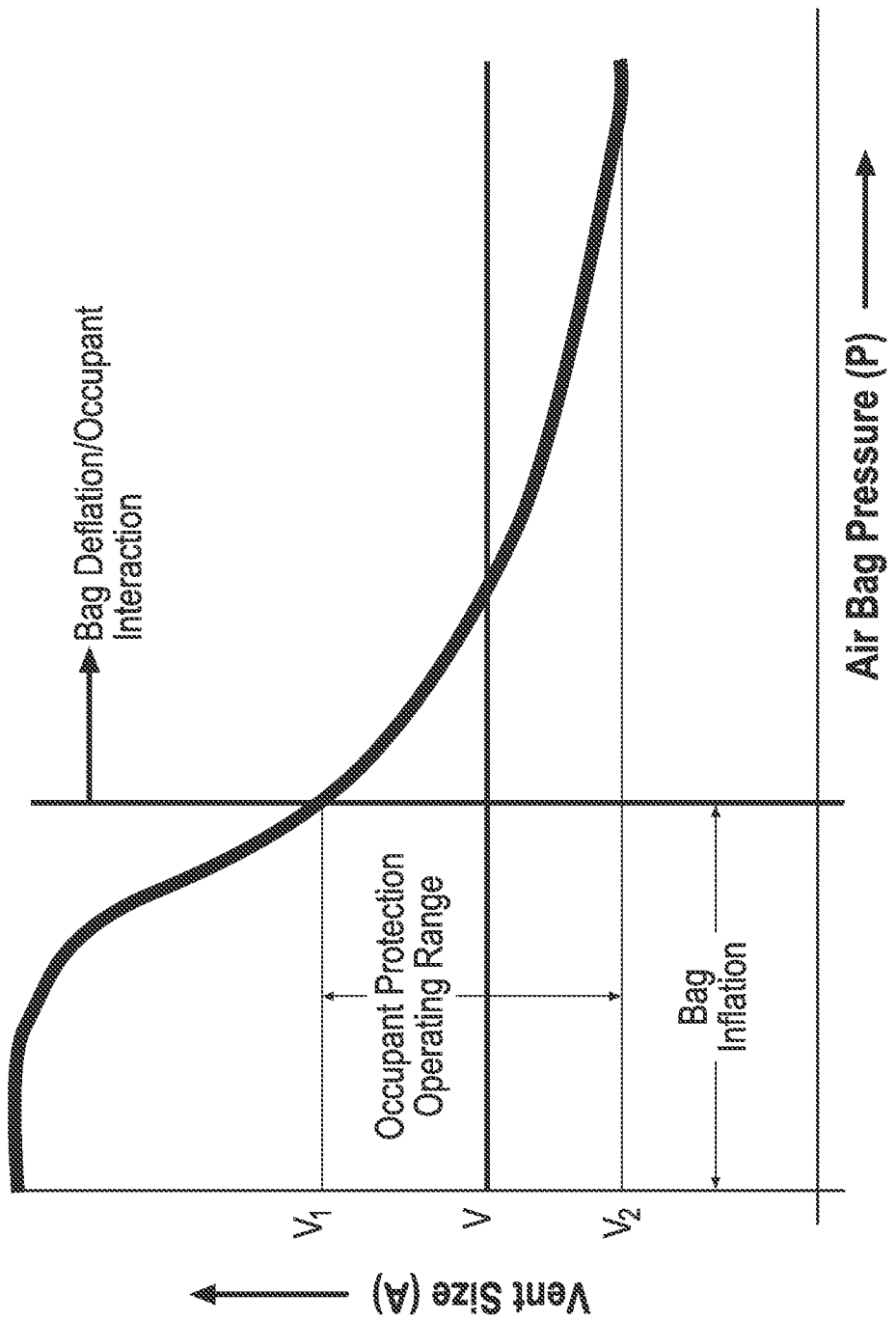
FIG. 6 is a graph illustrating the inversely proportional relationship between the size of an active vent according to the principles of the present disclosure and pressure exerted on an airbag including such a vent.

Referring to FIG. 6, both the reduced inflation pressure and the inverse relationship between a force applied to an inflated airbag and the vent size are graphically illustrated. An active vent according to the principles of the present disclosure is at its maximum size in the uninflated state of the airbag. During inflation, while the vent is constricting, the inflation pressure is relatively less than a typical design for an elastically deformable airbag, in which a vent would be at its smallest size to start. At a minimum operating pressure, the active vent of this disclosure has a size V1. The active vent of this disclosure may constrict up to a minimum size V2 based on the magnitude of a force applied to the inflated airbag, and thereby provide a range of stiffness performance. In contrast, typical current elastically deformable airbags are only calibrated at a single stiffness, illustrated at V in FIG. 6.

An airbag module having an airbag bladder with an active vent according to the present disclosure may further vary in numerous ways according to the present disclosure. For example, the various components may be arranged in a variety of configurations. In another example, an airbag module and its components according to the present disclosure may include an variety of materials.

In the drawings, the same reference numbers indicate the same elements. Further, some or all of these elements could be changed. Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. An airbag module comprising:
an inflator;
a main body substantially enclosing an interior volume, the inflator in fluid communication with the interior volume, the main body being elastically expandable to an inflated configuration at a first operating pressure;
a vent aperture in the main body; and
a vent cover at least partially overlapping the vent aperture, the vent aperture and the vent cover defining a passage between the vent aperture and the vent cover from the interior volume to outside of the main body, the vent cover configured to constrict the passage proportionately to a pressure increase in the interior volume and configured to open the passage proportionately to a pressure decrease in the interior volume of the main body;
wherein the main body in the inflated configuration has a stiffness that varies based at least in part on the pressure increase in the interior volume.

2. The airbag module of claim 1, wherein the interior volume of the main body in the inflated configuration is a substantially continuous void bounded by the main body.

3. The airbag module of claim 1, wherein at least a portion of the vent aperture extends outside of the vent cover in the inflated configuration of the main body.

4. The airbag module of claim 1, wherein the vent cover is larger than the vent aperture in at least one direction.

5. The airbag module of claim 1, wherein the vent cover includes corrugations, the main body includes corrugations adjacent at least a portion of the vent aperture, and the corrugations of the vent cover and the main body are offset.

6. The airbag module of claim 1, wherein the vent aperture and the vent cover maintain a minimum size of the passage at and above a pressure threshold of the interior volume of the main body.

7. The airbag module of claim 1, further comprising:
a plurality of vent apertures; and
a corresponding plurality of vent covers, each having at least a portion partially overlapping one of the vent apertures, the vent apertures and the vent covers respectively defining a plurality of passages from the interior volume to outside of the main body, the vent covers respectively configured to constrict the passages proportionately to the pressure increase in the interior volume.

8. The airbag module of claim 1, wherein the main body and the vent cover have a single material composition.

9. The airbag module of claim 8, wherein the main body and the vent cover are integrally formed.

10. An apparatus comprising:
an airbag bladder substantially enclosing an interior volume, the bladder being configured to be operably connected to a vehicle airbag module, the bladder being elastically expandable to an inflated configuration at a first operating pressure of the interior volume; and
an active vent in the bladder defining a passage between the vent aperture and the vent cover from the interior volume to outside of the bladder, the active vent including a vent aperture and a vent cover at least partially overlapping the vent aperture, the active vent configured to constrict the passage proportionately to a pressure increase in the interior volume and configured to open the passage proportionately to a pressure decrease in the interior volume of the main body;
wherein the bladder in the inflated configuration has a stiffness that varies based at least in part on the pressure increase in the interior volume.

11. The apparatus of claim 10, wherein the active vent maintains a minimum size of the passage at and above a pressure threshold of the interior volume of the bladder.

12. The apparatus of claim 10, wherein the interior volume of the bladder in the inflated configuration is a substantially continuous void bounded by the main body.

13. The apparatus of claim 10, wherein the bladder and the vent cover are integrally formed.

14. An apparatus comprising:
an elastic main body substantially enclosing an interior volume, the main body configured to fluidly couple the interior volume and an inflator, the main body having an inflated configuration at a first operating pressure in which the interior volume is a substantially continuous void;
a vent aperture in the main body; and
a vent cover at least partially overlapping the vent aperture, the vent aperture and the vent cover defining a passage between the vent aperture and the vent cover from the interior volume to outside of the main body, the vent cover being configured to constrict an opening of the passage proportionately to a pressure increase in the interior volume and configured to expand the opening of the passage proportionately to a pressure decrease in the interior volume of the main body, the opening of the passage maintaining a minimum size at a pressure threshold of the interior volume;
wherein the main body in the inflated configuration has a stiffness that varies based at least in part on the pressure increase in the interior volume.

15. The apparatus of claim 14, wherein the stiffness characteristic of the main body varies proportionately to the pressure decrease in the interior volume from the first operating pressure.

16. The apparatus of claim 14, wherein the main body and the vent cover are integrally formed.

* * * * *